United States Patent [19]

Leo

[11] Patent Number: 5,391,390
[45] Date of Patent: Feb. 21, 1995

[54] TREATMENT OF BULB VEGETABLES SUCH AS GARLIC, ONIONS AND THE LIKE TO FREE THEM FROM THE SO-CALLED DAY-AFTER EFFECT

[76] Inventor: Franca Leo, Corso Francia, 35, 10138, Torino, Italy

[21] Appl. No.: 962,970

[22] Filed: Oct. 16, 1992

[30] Foreign Application Priority Data

Oct. 21, 1991 [IT] Italy .................. MI91 A 002778

[51] Int. Cl.⁶ .................. A23B 7/024; A23L 1/211; A23L 1/223
[52] U.S. Cl. .................. 426/638; 426/385; 426/431; 426/456; 426/640
[58] Field of Search ............... 426/456, 638, 640, 384, 426/385, 431

[56] References Cited

U.S. PATENT DOCUMENTS

H 70   6/1986   Berkowitz et al. ................ 426/385

FOREIGN PATENT DOCUMENTS 5016857   6/1975   Japan .
2016958   1/1990   Japan .
1386236   3/1975   United Kingdom .

OTHER PUBLICATIONS

Abstract: GO, "Garlic stem extract for beverage-is prepd. from freeze-dried powder by extn. with stem, and causes *no breath odor*," Japanese Patent No. JP 2016958, Derwent Publications WPIL database (19 Jan. 1990).

Abstract: Japan Natural Food, "Garlic-contg. enteric coated pills prodn. -by freezing bulbs in liq. nitrogen, powdering, free-drying, forming into pills and coating," Japanese Patent No. JP 60252426, Derwent Publications WPIL database (13 Dec. 1986).

Abstract: Mosc. Food Ind. Techn. "Liq. food-extracts drying eg. in Ginseng powder prodn.-by placing extract in cell on cooling plate of sublimation-drying appts. and drying at cryoscopic temp.," Soviet Union Patent No. SU 1554872, Derwent Publications WPIL database (7 Apr. 1990).

*Primary Examiner*—Donald E. Czaja
*Assistant Examiner*—Curtis E. Sherrer
*Attorney, Agent, or Firm*—Edward D. Manzo; Ted K. Ringsred

[57] ABSTRACT

Garlic, onion or like bulb vegetables are whisked in an appropriate quantity of water to obtain an intermediate product having the consistency of a very fluid cream which is subsequently subjected to freeze drying. The product obtained, ground to a powder, subsequently reconstituted with pre-selected comestible liquids, has been found to possess the properties of the starting bulbs but did not have the offensive day-after effect.

4 Claims, No Drawings

5,391,390

TREATMENT OF BULB VEGETABLES SUCH AS GARLIC, ONIONS AND THE LIKE TO FREE THEM FROM THE SO-CALLED DAY-AFTER EFFECT

The present invention relates to a treatment for bulb vegetables such as garlic, onion and the like to free them from the so-called day-after effect.

By way of example, in the following description explicit reference will be made to garlic, but it is intended that the whole of the description and claims extend also to onion and similar bulb vegetables.

The beneficial properties of garlic have been well known since antiquity, as have all its organoleptic characteristics, in particular its penetrating smell.

Tied to these organoleptic characteristics is the wide use of garlic and the fact that it is held in high esteem for cooking by a large number of peoples, both for basic cooking and in the so-called "haute cuisine" or culinary art.

But it is recognized that the use of both raw and cooked garlic is also recognized to have a great disadvantage due above all and in particular to the persistence of its penetrating smell which lasts for many hours after its ingestion and which, reappearing on the consumer's breath or perspiration, is decidedly unpleasant.

This is the so-called "day-after effect" of garlic.

The various recipes devised until now for reducing this unpleasant effect are of little value.

The fear of "smelling of garlic" and thus of being offensive and unpleasant to other people has, justifiably, until now discouraged and still does discourage many people from consuming garlic and they thus refuse to eat dishes, sauces and meals prepared with it and also, as a consequence, relinquish all the benefits which are recognized to result from the consumption of garlic, in particular raw garlic. In this connection it is appropriate to recall that these properties are fundamentally of a hypotensive, antiseptic expectorant and rubifaceant character.

Moreover it is known that garlic acts as a stimulant for the secretion of bile. The essential oil of the garlic passes easily from the digestive tract to all human body tissue from which it is eliminated through exhaled air, perspiration and urine.

The beneficial properties of garlic are part of popular tradition and have recently been confirmed by accurate, scientific clinical research.

So as not to lose these beneficial results which are widely available from a natural product such as garlic, various processes and technologies have been devised which are more or less satisfactory for eliminating, or at least drastically reducing, the organoleptic properties of garlic while retaining all its components to which the said beneficial effects are due.

Obviously, products thus obtained are administered at a medical or pharmaceutical level and absolutely not as products for use to be utilized in cooking where they would certainly not resolve the problem (of the day-after effect) for those who would like to use and consume garlic at a culinary level.

The problem with which the present invention is concerned is that of devising a treatment for garlic (and for onion and similar bulb vegetables) which, whilst still retaining all the traditionally and scientifically recognized beneficial properties and also leaving its peculiar organoleptic characteristics untouched, but only on consumption, eliminates the disadvantage of the day-after effect, that is to say the reappearance, through the breath and perspiration, of those components which, degraded, are the cause of the bad smell.

Garlic thus treated can be widely consumed with confidence by those holding it in high estimation both at the culinary level and at the curative level.

The problem is resolved according to the present invention by a treatment for bulb vegetables such as garlic, onions and the like, to free them from the so-called day-after effect, which comprises the successive steps of forming a suspension of the bulb vegetable in water with a water/bulb ratio in the range 2/1 to 5/1 by weight, freeze drying the said aqueous suspension with an initial freezing thereof down to $-50°$ C. continued for 4 to 8 hours, followed by a gradual heating stage up to a temperature not exceeding $50°$ C. for a period of between 12 and 24 hours, thus obtaining a dehydrated powder of the bulb having a relative moisture content of from 1 to 3%.

It is advantageous if the suspension in water is obtained by whisking the bulb vegetable in cold water to a creamy-fluid consistency.

The product obtained by the treatment of this invention is subsequently vacuum packed by using conventional techniques and then stored.

Upon use, after reconstitution in water, oil or other comestible liquids required by the preferred recipe, the garlic, thus treated, will have all the organoleptic characteristics of fresh garlic and, even when used in generous quantities, will not give rise to any day-after effect.

Garlic (and onion and like bulb vegetables) treated according to the invention will naturally be able to be utilized in all cooking recipes in which it is normally found and used to advantage.

Its use in the preparation of pesto sauce will be particularly welcome and effective where, in a mixture with basil, olive oil and pine kernels, it will be entirely comparable with pesto sauce prepared from fresh ingredients. However, it is confirmed that, compared with freshly prepared pesto, it will not give rise to the unpleasant day-after effect.

Other ingredients, such as for example basil, can be subjected to the treatment of the present invention specifically devised for garlic, so that at the end of the freeze-drying phase there is obtained a long lasting product which can be utilized rapidly for the preparation of the desired dishes.

Hereinafter there is given an example of one embodiment of the treatment of garlic according to the present invention and an example of the same treatment extended to the combination of garlic and basil.

EXAMPLE 1

Cloves of fresh garlic to a total weight of 700 grams were separated from their vegetable skin cladding and subsequently loaded into a container provided with a blade agitator; to this container were added 1000 cc of water and the agitator was put into rotation with, essentially, a whisking action.

During this action a further 450 cc of water were added. The agitator was stopped when the whisked material had a consistency and aspect of a very fluid cream.

This intermediate product was metered into bowl-like containers which were loaded into a freeze-drying apparatus.

The freeze-drying step was performed by freezing the intermediate product down to a temperature of −50° C. which was maintained for 4.30 hours, followed by gradual heating up to 42° C. (sublimation) which was maintained for 16 hours.

Solid cakes were unloaded from the freeze dryer were ground to obtain a garlic powder having a relative moisture content of 2%.

This powder, when reconstituted with appropriate quantities of water, was consumed by a taster and found to possess all the organoleptic characteristics of the raw garlic utilized in the process. The following day there was no trace of the "garlic smell" on the breath and/or in the perspiration of the consumer.

EXAMPLE 2

Cloves of ripe garlic to a total weight of 1500 grams were peeled of the dry vegetable skin and loaded into a container provided with a blade agitator; to this container were added 1500 cc of water and the agitator was then put into rotation with essentially a whisking action. During this action ,a further 1500 cc of water was added. The agitator was stopped after about 2 minutes when the whisked material had reached the consistency and aspect of a very fluid cream.

This intermediate product was metered into bowl containers which were loaded into a freeze-drying apparatus.

The freeze-drying step was performed with a preliminary freezing of the intermediate product down to a temperature of −45° C., which was maintained for about 8 hours, after which it was heated gradually up to 155° C. (sublimination) which was maintained for 14 hours.

Solid blocks were unloaded from the freeze dryer and were ground to obtain a garlic powder having a relative moisture content of 1.2%.

This powder, when reconstituted with appropriate quantities of water, was consumed by a taster and found to possess all the organoleptic characteristics of the ripe garlic utilized in the process. The following day there was no trace of any garlic smell on the breath and/or in the perspiration of the taster.

EXAMPLE 3

Cloves of red garlic to a total weight of 1000 grams were peeled and subsequently loaded into a container provided with a blade agitator; to this container were added 1000 cc of water and the agitator put into rotation with essentially a whisking action.

During this action a further 4000 cc of water were added. The agitator was stopped after 3 minutes from commencement of rotation and the intermediate product thus obtained was very fluid. This intermediate product was metered into bowls which were loaded into a freeze dryer.

The freeze drying was performed by freezing the intermediate product down to a temperature of −45° C. which was maintained for about 8 hours, followed by gradual heating to 45° C. (sublimation) which was maintained for 24 hours.

From the freeze dryer were unloaded solid blocks which were ground to obtain a garlic powder having a relative moisture content of 3%.

This powder, when reconstituted with appropriate quantities of water, was consumed by a taster and found to possess the organoleptic characteristics which were slightly attenuated compared with those of the red garlic utilized. The following day there was no trace of any garlic smell on the breath and/or in the perspiration of the taster.

EXAMPLE 4

Example 1 was repeated exactly with the variant the container provided with the agitator was loaded simultaneously with the garlic and with an appropriate quantity of Ligurian basil in a weight ratio, with respect to the weight of garlic normally utilized for obtaining pesto sauce. (Genoese pesto).

When the agitator was stopped, the whisked mixture was bright green and had the consistency of a very fluid cream.

This intermediate product was metered into bowls which were loaded into a freeze dryer.

The freeze drying was carried out exactly as described in Example 1.

From the freeze dryer were unloaded solid blocks which were ground to obtain a powder constituted by a mixture of garlic and basil having a relative moisture content of 2%.

The powder was reconstituted with extra virgin oil and ground pine kernels and an appropriate quantity of hot water from a food pasta called noodles were added. The pesto thus obtained was poured onto the drained noodles and the dish was completed with a generous portion of grated cheese.

A portion of noodles with the pesto thus prepared was consumed by a taster. The pesto possessed organoleptic properties (taste of garlic and basil) entirely comparable with those of freshly prepared Genoese pesto made from fresh ingredients. The following day there was no trace of any garlic smell on the breath or in the perspiration of the taster.

I claim:

1. A treatment for strong-smelling bulb vegetables to free them from the so-called "day after effect" comprising the successive steps of:
   forming a suspension of the bulbs in water in a bulb-/water ratio in the range ½ to 1/5 by weight, wherein said suspension is obtained by whisking the bulb vegetables in water; and
   freeze drying said suspension with a preliminary freezing phase of the suspension down to −50° C. for 4 to 8 hours followed by a gradual heating phase for 12 to 24 hours to a temperature not exceeding 50° C. to obtain a powder from said bulbs having a relative moisture content of between 1 and 3%.

2. A treatment according to claim 1, wherein said aqueous suspension further includes basil.

3. The treatment of claim 1, wherein said suspension is obtained by whisking the bulb vegetables in water at ambient temperature.

4. The treatment of claim 1, wherein said suspension is obtained by whisking the bulb vegetables in water at cold temperature.

* * * * *